Oct. 23, 1951     R. F. WILD     2,572,794
RIPPLE-FREE PHASE SENSITIVE RECTIFIER
Filed June 29, 1949     2 SHEETS—SHEET 1

*INVENTOR.*
RUDOLF F. WILD
BY Arthur H. Swanson
ATTORNEY.

Oct. 23, 1951 — R. F. WILD — 2,572,794
RIPPLE-FREE PHASE SENSITIVE RECTIFIER
Filed June 29, 1949

INVENTOR.
RUDOLF F. WILD
BY Arthur H. Swanson
ATTORNEY.

Patented Oct. 23, 1951

2,572,794

UNITED STATES PATENT OFFICE 2,572,794

RIPPLE-FREE PHASE SENSITIVE RECTIFIER

Rudolf F. Wild, Wilmington, Del., assignor to Minneapolis-Honeywell Regulator Company, Minneapolis, Minn., a corporation of Delaware Application June 29, 1949, Serial No. 101,974

4 Claims. (Cl. 250—27)

1

The general object of the present invention is to provide an improved electronic rectifier of the phase sensitive type in which the relative polarities of the rectifier output terminals depend on whether the alternating current rectified is of one phase or of the opposite phase.

The present invention was primarily devised and is well adapted for use in a measuring and control apparatus or system of the known type in which a minute D. C. voltage is converted into an alternating current voltage, amplified in a multi-stage electronic amplifier, and then reconverted into direct current, which may be measured or utilized for control purposes. The reconversion is effected by means of a phase sensitive rectifier which forms the final or output section of the conversion amplifying and reconversion system. It is known that, in such a system, a degenerative direct current signal suitably fed back from the rectifier output into the amplifier contributes to stability of operation of the system. The effectiveness of such feed back is impaired, however, by time lags in the phase sensitive rectifier output and feed back currents.

The primary object of the invention is to eliminate or reduce ripple voltage from the degenerative signal fed back into the amplifier from the rectifier output circuit, while at the same time avoiding the time lags in the feed back inherent in the use of filters heretofore customarily employed to minimize such voltage ripple.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which are illustrated and described preferred embodiments of the invention.

Figure 1:
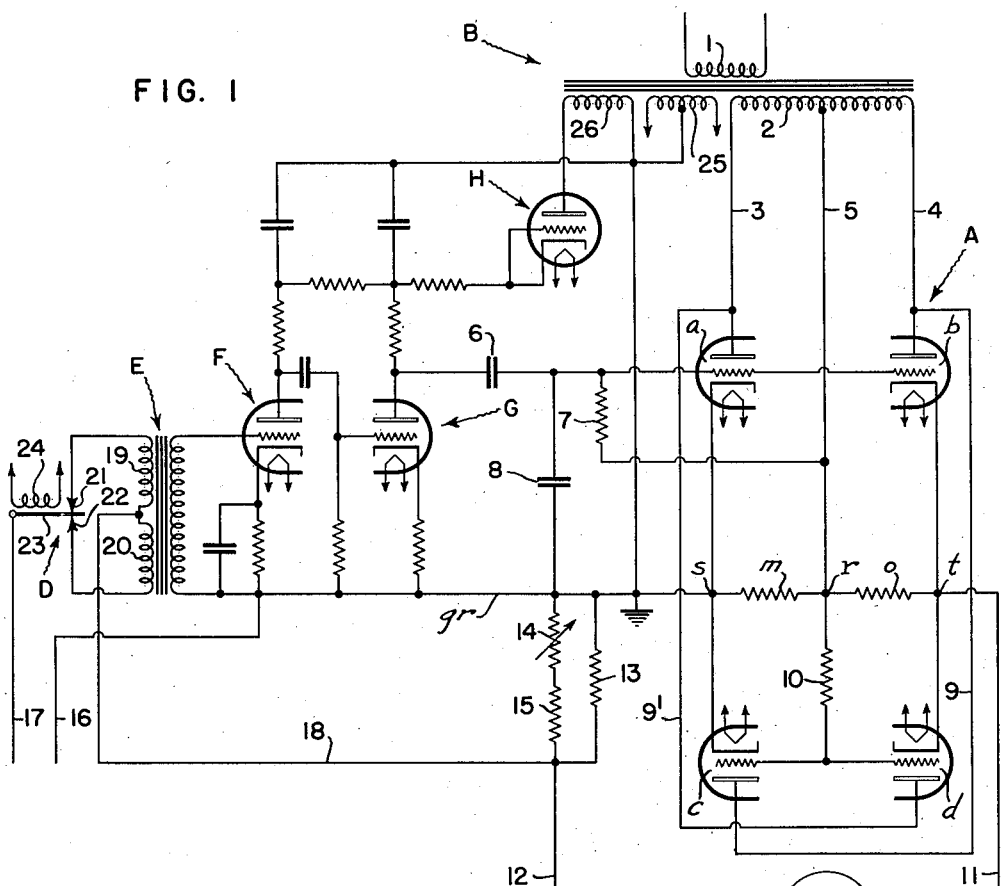
Fig. 1 is a diagram illustrating one embodiment of my invention.

In the embodiment of the invention illustrated in Fig. 1, a phase sensitive electronic rectifier A is provided with one form of my novel means for

2 eliminating or reducing voltage ripple in the output of the rectifier. The rectifier A comprises a pair of rectifier valves $a$ and $b$, and two associated ripple eliminating valves $c$ and $d$. The valves $a$, $b$, $c$, and $d$ are similar valves having control grids, and in practice each of said valves may well be one-half of a valve of the commercially available 7N7 type.

The rectifier is energized by a transformer B having a primary winding 1 adapted to be connected to a source of alternating current of commercial voltage and frequency: for example, 115 volts and 60 cycles per second. A secondary winding 2 of the transformer B has end terminals 3 and 4 connected to the anodes of the valves $a$ and $b$, respectively, and has a center tap terminal conductor 5. The latter is connected at the point $r$ to the connected ends of cathode resistors $m$ and $o$ through which the conductor 5 is connected to the cathodes of the valves $a$ and $b$, respectively. The points of connection of the resistors $m$ and $o$ to the cathodes of the valves $a$ and $b$ are designated $s$ and $t$, respectively. The point $s$ is shown as grounded through its connection to a grounding conductor $gr$.

The control grids of valves $a$ and $b$ are connected to one another and to one terminal of a coupling condenser 6 through which an alternating current signal is impressed on said control grids. Said signal is of the same frequency as the current supplied by the winding 2 to the anodes of the valves $a$ and $b$, and is either of the same phase as the current supplied through the terminal 3 to the anode of the valve $a$, or is of the opposite phase: i. e., of the same phase as the current supplied through transformer terminal 4 to the anode of the valve $b$. Whether said signal is of said one phase or of the opposite phase depends on an operating condition as is hereinafter explained. The control grids of valves $a$ and $b$ are shown as connected through a grid resistor 7 to the conductor 5, and thereby through the cathode resistors $m$ and $o$ to the cathodes of the valves $a$ and $b$, respectively. The control grids of the valves $a$ and $b$ are also connected to ground through the condenser 8.

The anode of the valve $c$ is connected through a conductor 9 to the transformer terminal 4, and hence, to the anode of the valve $b$. The cathode of the valve $c$ is connected to the cathode of the valve $a$ and to the grounded point $s$. The anode of the valve $d$ is connected by a conductor 9' to the transformer terminal 3 and thereby to the anode of the valve $a$. The cathode of the valve $d$ is connected to the cathode of the valve $b$ at the point $t$. The resistors $m$ and $o$ thus serve as cathode resistors for the valves $c$ and $d$, as well as for the valves $a$ and $b$. The control grids of the valves $c$ and $d$ are each connected through a resistor 10 to the point $r$ and thereby through the respective cathode resistors $m$ and $o$ to the cathodes of the valves $c$ and $d$, respectively.

The phase sensitive rectifier A is well adapted for use, and was devised primarily for use, in a measuring or control system of the type in which a minute direct current signal is converted into alternating current and is then amplified to provide a signal. That signal, after its amplification, may be reconverted into a direct current signal of a magnitude greater than, but proportional to the magnitude of, the original direct current signal, and which is of one polarity, or of the opposite polarity depending on the direction of flow of the original direct current signal. As shown in Fig. 1, the device A serves as the phase sensitive rectifier section of a system of the character just described, in which the amplified alternating current signal is impressed on the device A through the coupling condenser 6. In the conventional form illustrated, the rectified output signal of the device A is impressed on a measuring or control instrument C shown as having one terminal directly connected through a conductor 11 to the point $t$, and having its second terminal connected through a conductor 12 and resistors 13, 14, and 15, to the point $s$. As shown, the resistor 14 is a variable resistor connected in series with the fixed resistor 15 between the conductor 12 and the grounding conductor $gr$. The resistor 13 is connected in parallel with the series connected resistors 14 and 15.

The means for developing and amplifying the signal impressed on the device A through the coupling condenser 6 comprises a conversion apparatus, including a current interrupter or vibrator D and a transformer E, first and second stage electronic amplifiers F and G, and a rectifier H which supplies anode voltage to the amplifier valves F and G. The valves F, G, and H may well be of the commercially available 7F7 type. The direct current signal to be amplified is transmitted to the conversion apparatus through input conductors 16 and 17 from the source of any such signal which it is desired to measure. Said source, for example, may be a direct current bridge in which the output current is reversed from time to time as a result of changes in operating conditions. As shown, the input conductor 16 is connected directly to the grounded conductor $gr$, and the latter is connected through the resistors 13, 14, and 15 and a conductor 18 to the junction of two coils or windings 19 and 20. Those coils collectively form the primary winding of the transformer E. The free end terminal of the winding 19 is connected to a stationary vibrator contact 21, and the free end terminal of the winding 20 is connected to another stationary vibrator contact 22. The contacts 21 and 22 are alternately engaged by a polarized vibrating contact or reed 23. The vibration frequency of the reed 23 is the same as the frequency of the current flow in the primary winding 1 of the energizing transformer B. The input terminal 17 is connected to the reed 23, and the latter is vibrated with the described frequency by a vibrator coil 24 having its terminals connected to the terminals of a secondary winding 25 of the transformer B by conductors only partially shown in the drawings.

The transformer B has a third secondary winding 26. The latter has one terminal grounded, and has its second terminal connected to the anode of the rectifier valve H. The latter is shown as a triode, but has its control grid connected to its cathode for operation of the valve as a diode. The secondary winding of the transformer E has one terminal connected to the grounded conductor $gr$, and has its second terminal connected to the control grid of the valve F. The valves F and G have their cathodes connected to the grounded conductor $gr$ through suitable cathode bias means, and have their anodes connected through suitable anode resistors and filter means to the cathode of the rectifier H. The output circuit of the valve F is coupled to the input circuit of the valve G, and the output circuit of the latter is connected by the coupling condenser 6 to the control grids of the valves $a$ and $b$ of the rectifier A.

As will be apparent from Fig. 1, the conductor 18 forms part of a feed back circuit through which a degenerative direct current voltage signal is fed back from the point $t$ of the phase sensitive rectifier A to the junction point of the windings 19 and 20 of the transformer E. The signal thus fed back to the amplifier input circuit contributes in a known manner to the stability of operation of the measuring or control system illustrated in Fig. 1. The degenerative signal thus fed back to the windings 19 and 20 through the conductor 18 is opposite in direction to the direct current signal impressed on the input terminals 16 and 17, and thus reduces the magnitude of the resultant signal which is converted into an alternating current signal and amplified. Further description of the apparatus shown in Fig. 1 for converting a direct current signal into alternating current of a predetermined frequency, and of a phase selectively dependent on the direction of flow of the direct current signal, is unnecessary, as apparatus for the purpose is well known, and one widely used form thereof is disclosed, for example, in the Wills Patent 2,423,540, of July 8, 1947.

Figure 5:
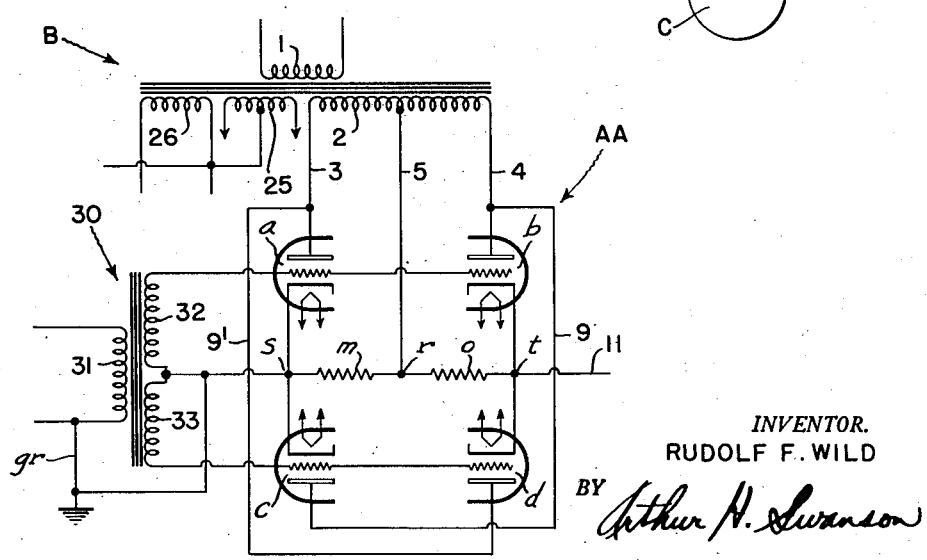
Figs. 5 and 6 illustrate different modifications of a portion of the apparatus shown in Fig. 1.
Figure 6:
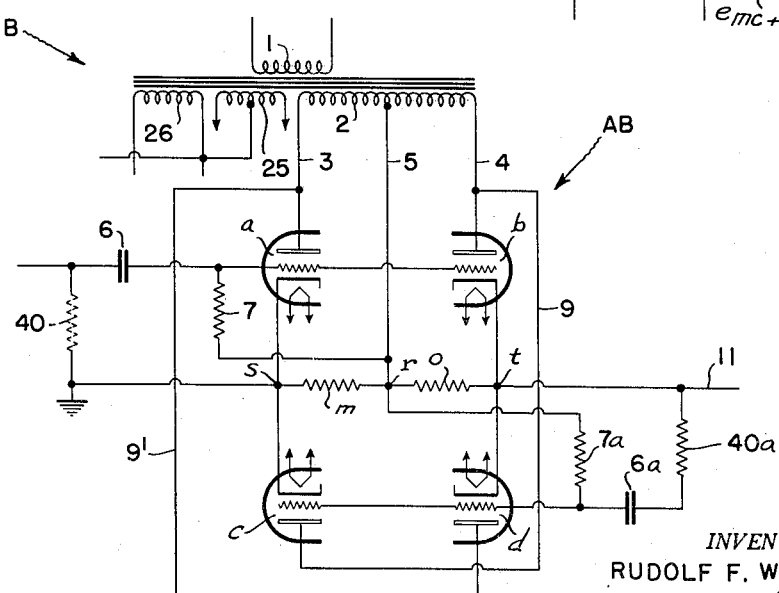

As has been made apparent, my invention disclosed herein consists in combining the valves $c$ and $d$ with the valves $a$ and $b$, in the general manner illustrated in one form in Fig. 1, and in modified forms in Figs. 5 and 6, to eliminate or reduce ripple voltage in the output circuts of the valves $a$ and $b$ and, hence, in the feed back circuit including the conductor 18. Unless the tendency to the production of such ripple voltage is suitably curbed, apparatus of the type shown in Fig. 1 will be incapable of producing satisfactory operational results. As previously explained, the ripple voltage tendency in such apparatus has heretofore been partially corrected, or compensated for, by the use of conventional filter means, usually in the form of a condenser in shunt with the resistor $m$ and a second condenser in shunt with the resistor $o$. The use of such filter condensers is open to the objection, however, that it involves time lags and thus greatly impairs the effectiveness of the feed back connection between the phase sensitive rectifier and the amplifier input.

Figure 2:
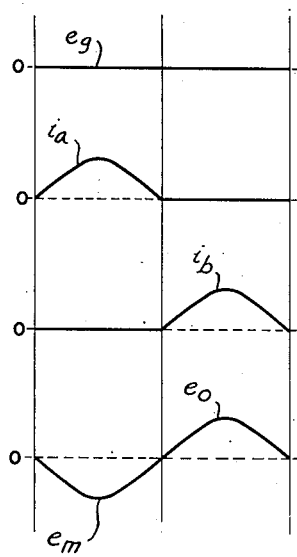
Fig. 2 is a diagram illustrating an undesirable operating condition avoided by the use of the present invention.

The curves shown in Fig. 2 illustrate and explain the formation of ripple voltage between the points $s$ and $t$ of the apparatus shown in Fig. 1 which would be produced if the valves $c$ and $d$ were not operatively connected to the valves $a$ and $b$, and if no other means for eliminating or reducing the ripple tendency were provided. The curves shown in Fig. 2 are based on the assumption that no signal is being impressed on the valves $a$ and $b$, so that the voltage signal curve $e_g$ is shown in Fig. 2 as a straight line at the zero voltage level. With no signal impressed on the grids of the valves $a$ and $b$, the valve $a$ will be conductive during each half cycle in which the transformer winding 2 makes the anode of the valve $a$ positive relative to the cathode of that valve. The current flow through the valve $a$ then produced is represented in Fig. 2 by the curve $i_a$. Under the assumed conditions, the valve $b$ is also conductive during each half cycle in which its anode is positive relative to its cathode, and the current flow through the valve $b$ is represented in Fig. 2 by the curve $i_b$. In Fig. 2 and in Fig. 3, plus and minus current values, shown by current curve points, are respectively indicated by the distances of those points above and below the corresponding base or zero line $o$—$o$. Similarly, in the voltage curves shown in Figs. 2, 3, and 4, positive and negative voltage values, at points on said curves, are respectively indicated by the distances of said points above and below the corresponding base or zero line $o$—$o$.

On the foregoing assumptions, the flow of the current $i_a$ through the cathode resistor $m$ creates a potential drop in that resistor which lowers the potential at the point $r$ relative to the potential at the point $s$, and is represented in Fig. 2 by a curve portion $e_m$. The current flow through the resistor $o$, during each half cycle in which the valve $b$ is conductive, increases the potential of the point $t$ relative to the potential of the point $r$, and is represented in Fig. 2 by the curve portion $e_o$. As the lowermost curve $e_m e_o$ of Fig. 2 indicates, the current flowing alternately through the valves $a$ and $b$, when the latter are not associated with ripple voltage compensating or reducing devices, and no signal is being impressed on the grids of said valves, produce a substantially pure sinusoidal voltage between the point $s$ and $t$. The fundamental frequency of that sinusoidal voltage is the same as the voltage $e_g$: i. e., 60 cycles per second.

Figure 3:
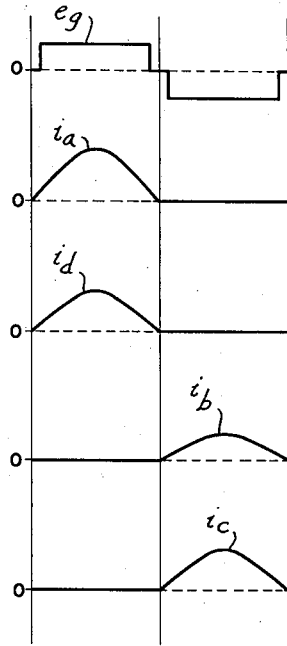
Figs. 3 and 4 are diagrams illustrating operating conditions in the apparatus illustrated in Fig. 1.
Figure 4:
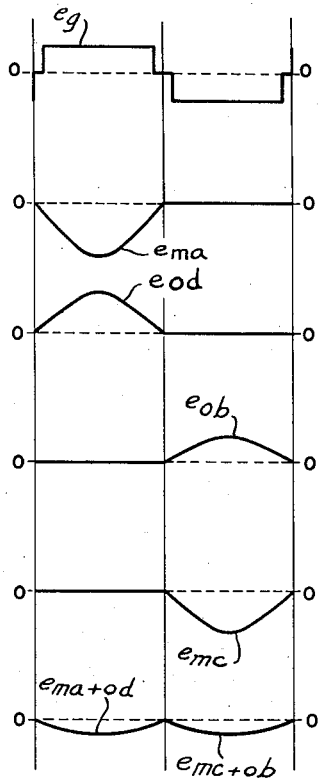

In Fig. 3, the top curve $e_g$ represents an alternating current voltage signal assumed to be imposed on the grids of the valves $a$ and $b$ through the coupling condenser 6, and the subjacent curves $i_a$, $i_d$, $i_b$, and $i_c$ represent the currents flowing through the anode circuits of the valves $a$, $d$, $b$, and $c$, when those valves are respectively conductive. In Figs. 3 and 4, as well as in Fig. 2, the valves $a$ and $b$ are assumed to be conductive during the first and second halves of the signal cycle respectively indicated by the left and right hand curve columns. Since the valves $c$ and $d$ are conductive during the half cycles in which the valves $b$ and $a$ are respectively conductive, the Fig. 3 curve $i_d$ representing the anode current through the valve $d$ is in the same column with the curve $i_a$ which represents the anode current through the valve $a$. Similarly, the curve $i_c$ representing the anode current through the valve $c$ is in the right hand column of Fig. 3 along with the curve $i_b$ which represents the anode current flowing through the valve $b$. The anode currents flowing during the half cycles in which the valves are respectively conductive are all represented by similar upwardly convex curves. The currents flowing through the valves $c$ and $d$ are equal in magnitude, since neither is affected by the signal voltage $e_g$. However, since the signal voltage $e_g$ is in phase with the anode current through the valve $a$, and is opposite in phase to the anode current in the valve $b$, the current $i_a$ in the valve $a$ is larger, and the current $i_b$ in the valve $b$ is smaller, than the currents flowing through the valves $c$ and $d$.

In Fig. 4, the uppermost curve $e_g$ represents the signal voltage impressed on the control grids of the valves $a$ and $b$, and is a duplicate of the curve $e_g$ of Fig. 3. In Fig. 4, the curve $e_{ma}$ represents the voltage drop in the resistor $m$ produced by the current $i_a$ of Fig. 3, and the curve $e_{od}$ represents the voltage drop in the resistor $o$ produced by the current $i_d$ during the first half of the same cycle. Similarly, the curves $e_{mc}$ and $e_{ob}$ represent the voltage drops in the resistors $m$ and $o$ respectively produced by the currents $i_c$ and $i_b$ flowing through those resistors during the second half of the same cycle. The currents flowing through the resistor $m$ when the valves $a$ and $c$ are respectively conductive tend to reduce the potential at the point $r$ relative to the ground potential at the point $s$, and the corresponding potential drops represented by the curves $e_{ma}$ and $e_{mc}$ are assumed to be negative voltages, and extend downwardly beneath the respective voltage zero lines $o$—$o$ of Fig. 4. Similarly, the currents flowing through the resistance $o$ when the valves $b$ and $d$ are respectively conductive tend to raise the potential at the point $t$ relative to the ground potential of the point $s$, and the corresponding potential drops are represented by curves $e_{od}$ and $e_{ob}$ extending above the respectively zero voltage lines $o$—$o$.

On the assumption that the resistances $m$ and $o$ are of the same magnitude, the voltage drops in those resistances will be proportional in magnitude to the currents represented by the Fig. 3 curves $i_a$, $i_b$, $i_c$ and $i_d$. Thus the voltage $e_{ma}$ will be larger and the voltage $e_{ob}$ will be smaller than each of the similar voltages $e_{mc}$ and $e_{od}$. On the assumption made, the resultant or algebraic sum of the first half cycle voltages $e_{ma}$ and $e_{od}$, and the resultant or algebraic sum of the second half cycle voltages $e_{mc}$ and $e_{ob}$, will each be negative voltages, as is indicated by the bottom curves $e_{ma+od}$ and $e_{mc+ob}$ in the two columns of Fig. 4. Thus the average potential of the point $t$ is lower than the constant earth potential of the point $s$ during both the first and second half cycles. A reversal in the phase of the signal $e_g$ would make the voltage drops $e_{ma}$ and $e_{ob}$ respectively smaller and larger than the voltages $e_m$ and $e_o$.

With similar grid voltage values, the values of the said resultant voltages shown by the lowermost curves of Fig. 4 are substantially lower than the voltages $e_m$ and $e_o$ shown in Fig. 2. Moreover, as has been previously explained, the ripple voltage shown by the lowermost curve of Fig. 2 is a sinusoidal voltage of the same fundamental 60 cycle frequency as the signal passing to the amplifier valve F from the transformer E. The fundamental frequency of the voltage collectively represented by the resultant voltages $e_{ma+od}$ and $e_{mc+od}$ of Fig. 4 is not 60 cycles, but is 120 cycles. A ripple voltage of that frequency does not have the objectable effect on the performance of the apparatus, shown in Fig. 1, which would be created by a 60 cycle voltage ripple of the same average magnitude.

The phase sensitive rectifier apparatus AA shown in Fig. 5 differs from the apparatus A of Fig. 1 in that a voltage signal is impressed on the control grids of the valves $c$ and $d$ of Fig. 5 which is similar in frequency and proportional in magnitude, but is opposite in phase, to the voltage signal impressed on the control grids of the valves $a$ and $b$. As shown, the phase sensitive rectifier section AA is coupled to the amplifier by a transformer 30 instead of the condenser 6 shown in Fig. 1. The transformer 30 is shown as comprising a primary winding 31 and two secondary windings 32 and 33. The primary winding 31 may have one terminal connected to the grounding conductor $gr$, and may have its second terminal connected to the anode of the amplifier valve G of Fig. 1 through a suitable isolating condenser. As shown, the connected terminals of the secondary windings 32 and 33 are connected to ground. The second terminal of the winding 32 is connected to the control grids of the valves $a$ and $b$, and the second terminal of the winding 33 is connected to the control grids of the valves $c$ and $d$. The windings 32 and 33 are so arranged that the potential of the terminal of the winding 32 connected to the grids of the valves $a$ and $b$ is 180° out of phase with the potential of the terminal of the winding 33 connected to the grids of the valves $c$ and $d$. The general operation of the circuit shown in Fig. 5 is like that of the circuit shown in Fig. 1, but is more efficient. For example, when the current through the valve $a$ of Fig. 5 increases by a certain amount, the current through the valve $d$ decreases by the same amount, thus producing an output voltage between the points $s$ and $t$ which is about double the output voltage produced with the arrangement shown in Fig. 1 for the same input signal.

As Fig. 1 makes apparent, with the grid leak resistor 7 connected to the point $r$, a certain asymmetry exists in the circuit, due to the fact that the output impedance of the preceding amplifier stage is coupled to the circuit of the device $a$ by the coupling condenser 6. For purposes of analysis, the output impedance of the second amplifier stage of Fig. 1 is indicated in dotted lines in Fig. 6 as a resistor 40. The impedance represented by the resistor 40 is a source of current distortion which can cause ripple voltage but which is substantially compensated for in the modified phase sensitive rectifier AB shown in Fig. 6. To appreciate the distorting effect of the impedance represented by the resistor 40, and the manner in which that effect is compensated for in Fig. 6, account should be taken of the fact that the series connected resistor 40, coupling condenser 6, and grid resistor 7 form a voltage divider and phase shifter connected across the resistor $m$. In the absence of any input signal, current flows through the valve $a$ and develops a voltage drop across the resistor $m$ every other half cycle. The portion of the voltage across the resistor $m$ which is developed across the portion of the voltage divider formed by the series connected resistor 40 and condenser 6, is applied to the control grids of the valves $a$ and $b$. This results in a distortion of the current through the resistor $m$ which prevents that current from being a pure half-sine wave when no input signal is impressed on the control grids of the valves $a$ and $b$.

In Fig. 6, the distorting effect of the voltage divider in parallel with the resistor $m$ is compensated for by connecting an analogous voltage divider consisting of resistors $7a$ and $40a$ and a condenser $6a$ across the resistor $o$. In Fig. 6, the control grids of the valves $c$ and $d$ are thus connected to the point $r$ through the resistor $7a$, and are connected to the conductor $11$ through the resistor $40a$ and condenser $6a$. The values of the resistor $7a$ and condenser $6a$ should be equal to the values of resistor 7 and condenser 6, respectively. The value of the resistor $40a$ should simulate the value of the resistance represented by the resistor 40 as closely as possible. In practice, the resistance $40a$ may well be made equal to the significant average value of the anode resistance of the amplifier valve G. The voltage divider thus connected in parallel with the resistor $o$ as shown in Fig. 6 compensates for a ripple voltage tendency inherent in the asymmetrical arrangement shown in Fig. 1. Although that tendency is relatively small, its elimination or substantial reduction augments the advantages attained by the inclusion of the valves $c$ and $d$ in the phase sensitive rectifier A shown in Fig. 1.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I do claim as new and desire to secure by Letters Patent, is:

1. In a circuit network including a phase sensitive rectifier of the known type comprising first and second electronic valves each having an anode, a cathode, a control grid, a cathode resistor and an output circuit including said anode, cathode, and cathode resistor, and means for passing current through each valve during periods alternating with those during which current is passed through the other valve, the two cathode resistors being connected in series between the two cathodes and one of said cathodes being connected to ground, and means for impressing an alternating current signal on the grids of the two valves which has the same frequency as the intermittent currents passed through said valves, and is in phase with one or the other of said currents, depending upon a condition of operation, the improved means for minimizing ripple voltage in said output circuits comprising a third electronic valve having an anode connected to the anode of said second valve and having a cathode connected to the cathode of said first valve, and a fourth valve having an anode connected to the anode of the first valve and a cathode connected to the cathode of the second valve.

2. Ripple voltage minimizing means as specified in claim 1, in which said third and fourth valves have control grids each connected to the cathode of the valve through the cathode resistor of the valve.

3. Ripple voltage minimizing means as specified in claim 1, in which said third and fourth valves have control grids, and which includes means for impressing a signal on the last mentioned grids similar in magnitude and frequency but opposite in phase to the signal impressed on the control grids of said first and second valves.

4. In a circuit network including a phase sensitive rectifier of the known type comprising first and second electronic valves each having an anode, a cathode, a control grid, a cathode resistor and an output circuit including said anode, cathode and cathode resistor, and means for passing current through each valve during periods alternating with those during which current is passed through the other valve, the two cathode resistors being connected in series between the two cathodes and one of said cathodes and one end of one of said cathode resistors being connected to ground, and means for impressing an alternating current signal on the grids of the two valves which has the same frequency as the intermittent currents passed through said valves, and is in phase with one or the other of said currents, depending upon a condition of operation, said last mentioned means including a first resistive device across which the alternating current signal is produced depending upon the condition of operation, a connection from one end of said first resistive device to the grounded end of said one cathode resistor, a connection from the other end of said first resistive device to the other end of said one cathode resistor including a first capacitive element and a first resistor in series, and a connection from the junction of said first capacitive element and said first resistor to the control grids of said two valves, the improved means for minimizing ripple voltage in said output circuit comprising a third electronic valve having an anode connected to the anode of said second valve and having a cathode connected to the cathode of said first valve, a fourth valve having an anode connected to the anode of the first valve and a cathode connected to the cathode of the second valve, a second resistor connected from the junction of said two cathode resistors to the control grids of said third and fourth valves, and a second capacitive element and a second resistive device connected in series from the control grids of said third and fourth valves to the other end of the second of said cathode resistors, said second resistor, second capacitive element and second resistive device each having characteristics respectively approximating those of the first resistor, first capacitive element and first resistive device.

RUDOLF F. WILD.

REFERENCES CITED

The following references are of record in the file of this patent:

UNITED STATES PATENTS

| Number | Name | Date |
|---|---|---|
| 2,297,543 | Eberhardt | Sept. 29, 1942 |